Aug. 1, 1939.　　　　　P. F. DANEL　　　　　2,168,117

APPARATUS FOR CONTROLLING LIQUID LEVELS

Filed May 7, 1936　　　　5 Sheets-Sheet 1

Inventor,
P. F. Danel

By Bönnelycke, Young, Emery & Thompson
Attys.

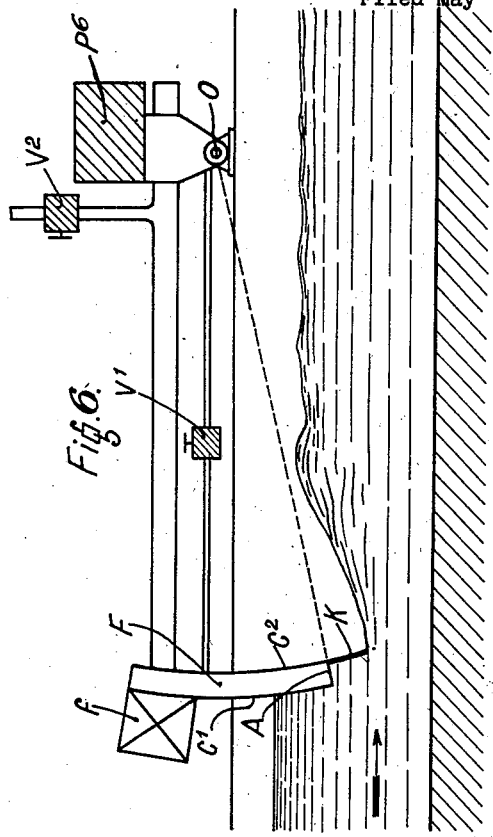
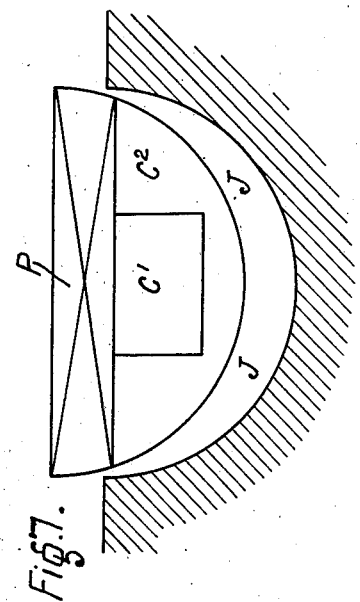
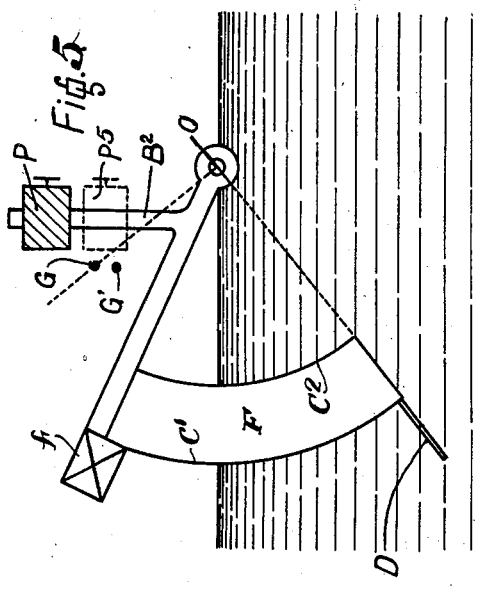

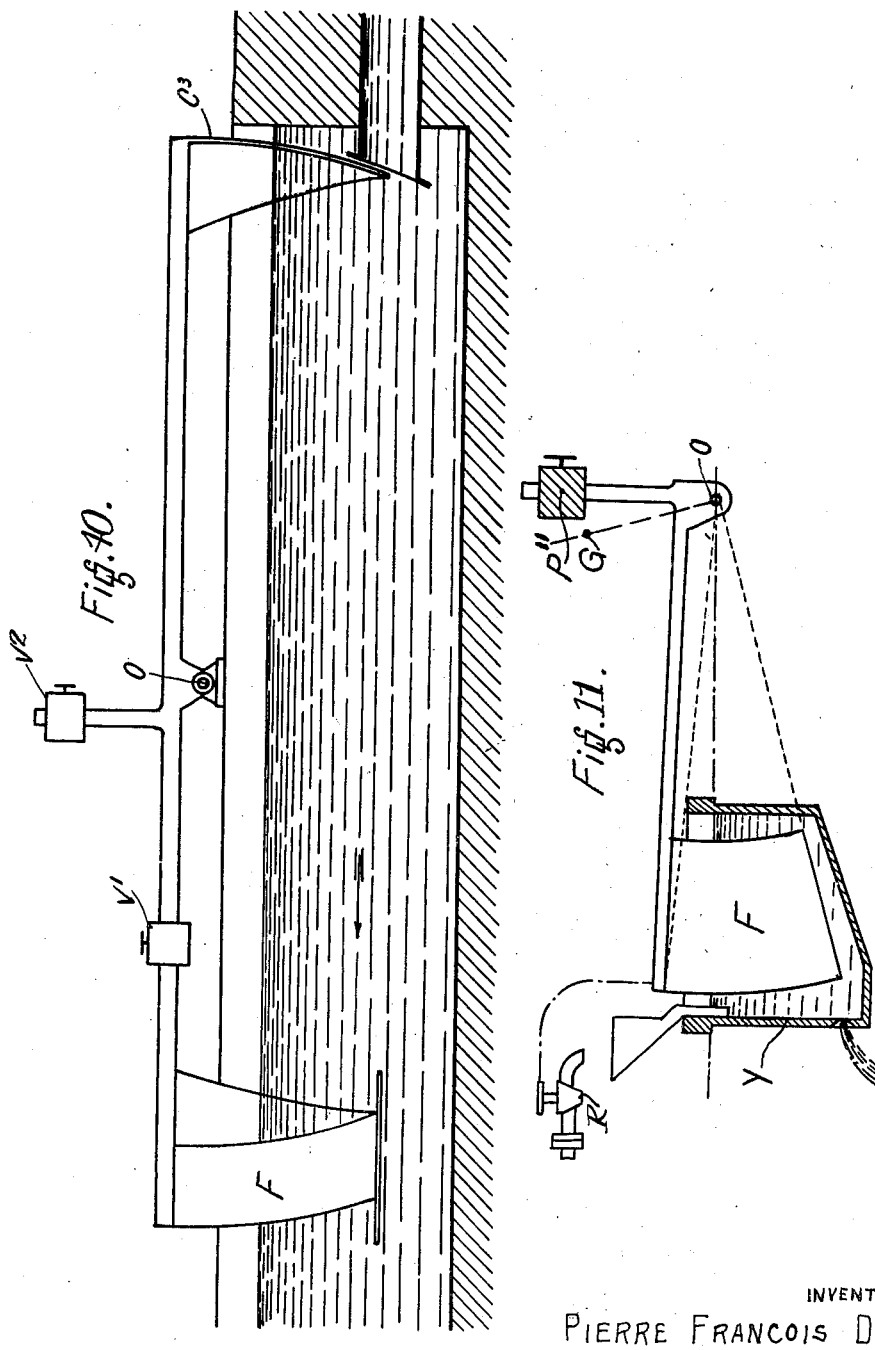

Aug. 1, 1939.  P. F. DANEL  2,168,117
APPARATUS FOR CONTROLLING LIQUID LEVELS
Filed May 7, 1936  5 Sheets-Sheet 5

INVENTOR
PIERRE FRANCOIS DANEL
BY
Emil Bönnelycke
ATTORNEY

Patented Aug. 1, 1939

2,168,117

UNITED STATES PATENT OFFICE 2,168,117

APPARATUS FOR CONTROLLING LIQUID LEVELS

Pierre François Danel, Grenoble, France, assignor to Ateliers Neyret-Beylier & Piccard-Pictet, a corporation of France Application May 7, 1936, Serial No. 78,514
In France May 14, 1935

7 Claims. (Cl. 61—25)

This invention relates to apparatus for controlling or indicating liquid levels and has for its object to provide apparatus applicable in particular to open canals and irrigation conduits for example, and adapted either to indicate the level of liquid in the canal or to detect variations of level, or to maintain a constant level or delivery or variable delivery between predetermined limits either directly or by means of suitable regulating members. The devices constructed according to the invention present the particularity of constituting movable but rigid assemblies free from any members acting in relative movement. They are therefore durable and cannot be put out of order and are well suited to their use; their sensitiveness is very high.

The essential feature of the invention consists in the combination of a float mounted to rotate or oscillate about a stationary axis with variable immersion, and of devices such as a counterweight or immersed body, for example, exerting a force opposed to that of the float, varying accordingly the position of the whole and according to a given law. From the combination thus constructed there result different properties which are put into practice in the devices described below.

In order that the invention may be more clearly understood reference will now be made to the accompanying drawings which show by way of example a preferred embodiment thereof.

In the drawings:—

Fig. 5 shows a device similar to that shown in Fig. 1, but not in unstable equilibrium, and capable of operating with a positive or negative decrement as will hereinafter appear; in this figure the device is also shown provided with an oscillation damping member.

Fig. 6 shows an oscillating gate operating according to a principle similar to that of the preceding devices.

Fig. 7 shows in front view the gate leaf of the gate according to Fig. 6, operating in combination with an open canal of parabolic section.

Fig. 10 shows a gate similar to that shown in Fig. 8 but in which the float and the gate leaf are located on opposite sides of the axis of oscillation, the installation shown ensuring a constant level downstream.

Fig. 11 shows a device constructed according to the invention for maintaining constant the level of liquid in a tank.

The floats ordinarily used for actuating apparatus responsive to variations of level are of substantially constant immersion, the only variation of immersion being that caused by the operating force necessary for moving the apparatus and for overcoming the friction of transmission.

The present invention comprises a device of variable systematic immersion composed of a float proper mounted to rotate or oscillate about an axis and a device opposing the hydraulic lifting force or moment exerted by the float.

Figure 1:
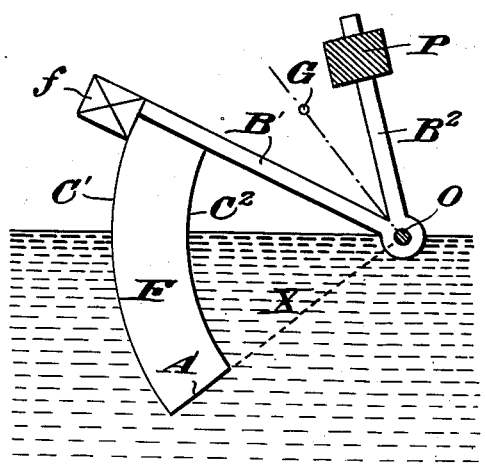
Figure 1 shows a device constructed according to the invention of unstable equilibrium and for which the level of liquid at which the apparatus is in equilibrium passes through the axis of oscillation, the force or moment opposed to that of the float being due to a weight.

By way of example, there is shown in Fig. 1 a float according to the invention provided with the float proper F carried by an arm $B^1$ mounted to rotate about the axis O. The float F is formed of two segmental cylindrical walls $C^1$ $C^2$, the axes of which coincide with axis O, two plane lateral faces perpendicular to the axis O and a flat bottom A, the plane X of which passes through the axis O.

The buoyant or lifting effect of the float F is opposed by a counterweight P carried by an arm B² and located in such a manner that the center of gravity G of the whole apparatus, including the float and weight, is located on a perpendicular to the plane X passing through axis O.

When the float is immersed by causing it to turn about its axis O, the moment corresponding to the Archimedean thrust on the float increases, but the opposing moment of the total weight of the apparatus acting at point G also increases with the cosine of the angle between line OG and the horizontal. The apparatus may be so constructed that the two opposed moments are constantly equal when the water level passes through the axis O.

Under these conditions, when the water level rises slightly, the moment produced by the float overcomes the weight moment and causes the apparatus to rotate in a clockwise direction about axis O until the bottom A of the float comes to the level of the surface of the water.

If, on the contrary, the level is lowered below the axis O, the weight moment overcomes the buoyant moment and causes the apparatus to rotate in a counter-clockwise direction about axis O through the whole of its possible course, this course being limited by means of a stop or supplementary float F (Fig. 1). It is maximum at a right angle.

The variation of level necessary to cause the apparatus to rotate about axis O in one direction or the other, according to the direction of the variation of the level relatively to the axis, must be sufficient to overcome friction and other mechanical resistance of the apparatus. The stroke of the apparatus for a given variation in water level being much greater than that of an ordinary constant immersion float, the available work for the same variation of water level with floats of the same section is considerably greater. It will therefore be seen that it is sufficient for the level to vary a very small amount, above or below the level of the axis O, so as to cause the apparatus to carry out its full stroke. The level of the axis is therefore a critical level.

In the apparatus of Fig. 1, the opposing moment is produced by the action of a counterweight. Without departing from the scope of the invention, the associated opposing moment can be obtained in any other suitable manner.

Figure 2:
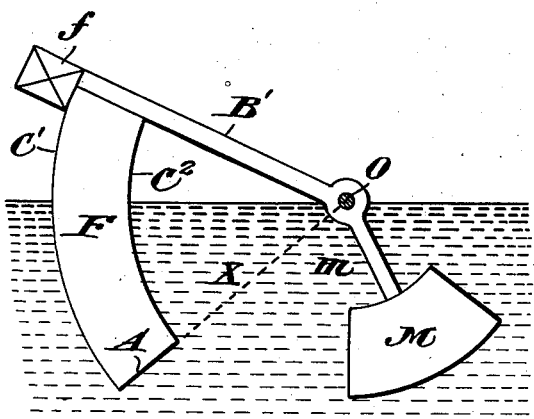
Fig. 2 shows a device similar to that shown in Fig. 1, the opposing force or moment being due to an immersed body.

In Fig. 2 there is shown an apparatus according to the invention in which the opposing moment is obtained by the thrust of the water on a completely immersed body carried by arm M. The weight of the water displaced by M plays the part of the counterweight of Fig. 1.

The shape of the float shown in Fig. 1 is not the only one possible. It suffices that the variation characteristic of the moment of the float is so correlated with the variation characteristic of the opposing moment as to obtain the desired action, which permits numerous modifications of construction.

Figure 3:
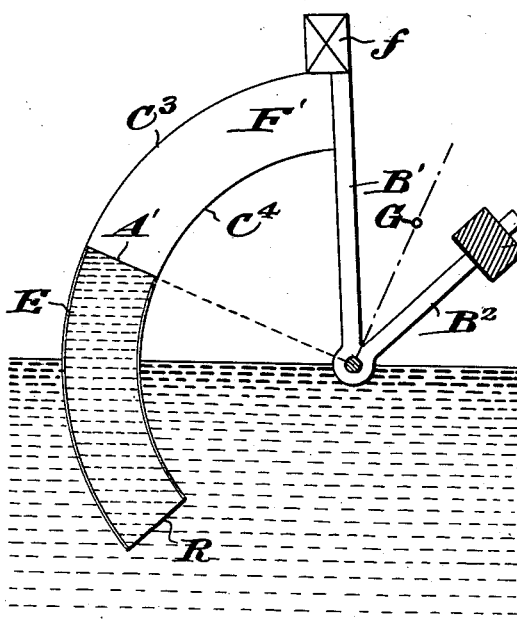
Fig. 3 shows a device similar to that shown in Figs. 1 and 2, but capable of a stroke of double amplitude by reason of the fact that the two opposing forces or moments are applied in different directions according as to whether the whole of the device is located in the first or the second half of its total stroke.

In Fig. 3 is shown a float F' according to the invention in which the segmental cylindrical walls C³ C⁴ and the lateral faces have been prolonged below the bottom A' so as to form a caisson E with a lower rectangular orifice R through which the water has access to the bottom A' when the caisson E is filled.

The lower extensions of the walls being very thin and the caisson being filled with water, no appreciable supplementary moments are introduced and the apparatus can function the same as that in Fig. 1 when the bottom A' is below the water level.

During the oscillation of the whole, the bottom A' of the float F' can rise higher than the water level, the water in the caisson E being retained therein. The bottom A' is therefore under a depression and the moment due to the float F' is changed in sign. The moment due to the weight of the apparatus acting at G is itself also changed in sign, as the center of gravity G has passed to the other side of the vertical plane passing through the axis. Equilibrium is therefore always possible.

In this manner, the useful stroke of the float may be carried through an angle of about 180°. At the end of the stroke, the orifice R is uncovered and the caisson E is emptied rapidly. This action may be utilized in certain apparatus, whereby the opposing moment may be disposed of entirely. In other cases, this action may be obviated by means of a stop limiting the stroke, or by any other device producing the same effect.

Figure 4:
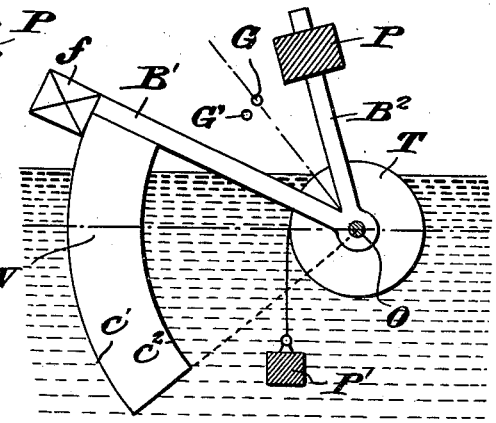
Fig. 4 shows a device similar to that shown in Fig. 1, but in which the level of liquid at which the apparatus is in equilibrium may be above or below the plane of the axis.

The critical level of the apparatus described in Figs. 1, 2 and 3 is the level of the axis of rotation. It is possible to construct an apparatus, the critical level of which is different from that of the axis. Fig. 4 shows an apparatus similar to Fig. 1, to which there has been added a supplementary counterweight P¹ suspended by a cable from a drum T secured to the apparatus and keyed to the axis.

When the counterweight P¹ is suspended from the drum on the same side as the float as shown in Fig. 4, the new critical level is above the axis O. When the counterweight P¹ is suspended on the other side of the drum to exert a clockwise moment the new level is lower than the axis O. The critical level can be adjusted by changing the weight P¹ or the diameter of the drum T.

The same result may be obtained without introducing any appreciable error by replacing the counterweight P¹ and its drum T by an additional mass V secured to the apparatus and passing through the horizontal plane of the axis in the mean position. This results in displacing the centre of gravity from G to G¹. The position of G¹ and the total weight of the apparatus can be calculated in such a manner that the new critical level remains substantially the same for all positions of the apparatus. By arranging the additional mass V slidable on a rectilinear rod passing through the axis there may be provided a simple means for adjusting the critical level.

In certain cases it may be convenient to change the critical level from a distance; the mass V may then be moved electrically for example.

In Fig. 5 is shown an apparatus according to the invention similar to that of Fig. 1 but in which the arm B² carrying the weight P does not pass through the axis O and is located vertically in the position of the figure.

In this position of the figure, when the weight is moved from P to P⁵, the centre of gravity of the whole is moved vertically from G to G¹ and the moment due to the total weight applied at G¹ remains the same as when it was applied at G. When nevertheless the apparatus is caused to turn in the direction which sinks the float, the level being at the axis, the moment due to the float will be the same as in the case of Fig. 1 while the moment due to the weight is visibly smaller. The float therefore brings the apparatus into the position in Fig. 5 where equilibrium is obtained.

For obtaining equilibrium with a greater sinking of the float it is necessary to reduce the moment of the float and consequently to lower the level.

It will therefore be seen that the apparatus in Fig. 5, with its weight displaced to P⁵, has a different position of equilibrium for each level and is no longer in unstable equilibrium at a predetermined level. As the position of the apparatus is determined by the level this may be used for transmitting to a distance variations in level or for actuating apparatus of which the position depends on the level and varies uniformly therewith.

The variation of the level for which the apparatus makes the whole of its useful stroke is termed the "decrement" of the apparatus. According as to whether G¹ is above or below G the decrement changes in sign. It will be understood that it is adjustable by moving P.

The possibility of adjusting the critical level as has been shown in Fig. 4, or creating an adjustable decrement according to Fig. 5 is, as will be understood, also possible in the case where the associated opposing moment is produced by an immersed body, a spring etc. It suffices to correlate suitably the characteristics of the float and of the opposing moment.

It will be understood that without departing from the scope of the invention there may be used a suitable damping device. By way of example there is shown in Fig. 5 a damping blade D which has proved to be particularly efficient and simple.

The apparatus of the type of that described by way of example in Fig. 5 may serve to actuate the limiting device for the opening of a hydraulic turbine or any other suitable regulating member of this machine in such a manner that the upstream level remains between the limits imposed which correspond with the decrement of the apparatus.

The actuation may be effected directly by mechanical means, shafts, cables, etc. or by means of a remote control, electrical, pneumatic, hydraulic or the like of a known type.

In the same manner the apparatus according to the invention may actuate level regulating gates, actuated by a servomotor. In this case the actuating apparatus is placed in the pond of which the level is to be regulated or in any other communicating well or pond. It actuates the distributor of the servomotor of the gates directly or by means of a relay.

The source of energy of the servomotor is immaterial as regards the subject of the invention as the latter relates to actuating means which may be adapted to all known types of servomotor operated automatic gates.

The apparatus according to the invention may also be utilised for the direct actuation of automatic gates without relays or servomotors. The gate should then be of a rotary or oscillating type, quasi balanced, and mounted directly on the shaft of the apparatus which is located in a lateral well at the opening of the gate, wells communicating with the side of the gate where the level is to be regulated. Instead of locating the actuating apparatus in a lateral well it is often convenient to incorporate the apparatus according to the invention in the gate itself of which it then forms an integral part.

By way of example there is shown in Fig. 6 an automatic gate according to the invention adapted to maintain constant the upstream level of the canal in which the gate is placed.

The gate is of the cylindrical sector type turning about an axis O. The apron of the gate is formed by means of the actuating float F of variable immersion, of which the wall C² has been extended laterally and underneath in such a manner as to adapt itself exactly to the walls of the canal, in the closed position.

By reason of the extension K of the wall C², the face A of the float is in a zone of dead water where the pressure is substantially the mean pressure of the upstream reach of the stream. The wall C² being cylindrical and having its axis coincident with the axis O, the downstream flow cannot create any moment tending to rotate the gate about axis O.

Besides the counterweight P⁶ the gate may be provided with two adjustable masses V¹ and V². The whole of these counterweights and weight of the gate produce a moment opposed to that of the float according to the invention.

The mass V¹ may serve to change the critical level of regulation as has been seen from the description of Fig. 4.

The mass V² may serve to create a decrement of level with the opening of the sluice in one direction or the other, or on the contrary to correct an existing decrement by reason of a defect of the sluice or for any other reason.

When the upstream delivery varies, the level tends to vary and disturbs the equilibrium of the gate, which then moves in the direction to reestablish the level. For a given delivery the gate can have only one position of equilibrium, i. e., that which gives the gate the necessary opening for allowing the delivery of liquid from the upstream reach while maintaining the level at the side fixed. The actuating system being adjusted as in the case of Fig. 1 the gate is no longer in unstable equilibrium in every position as is the case in still water but only in its position determined by the delivery.

The position of the gate is therefore associated with the delivery and the gate can maintain a constant level when the flow varies from zero to the maximum value of the canal. The gate is also stable when there is introduced a decrement of level, which decrement is then associated with the delivery. It is said that the decrement is positive when the level rises with the delivery and that it is negative in the contrary case.

The gate according to the invention may thus operate with a positive or negative decrement. The production of a stable operation with a negative decrement considered impossible with the known types of automatic gates, is capable of interesting commercial applications as will be indicated hereinafter.

In Fig. 7 there is shown in front view a gate of the type of that shown in Fig. 6.

The canal being of parabolic section, the face C² has been extended as above described. With this arrangement it will be seen that when the gate is open it leaves a considerable amount of play $j$ between its outer contour and the walls of the canal; as a result friction is reduced and the sensitiveness of the gate is very high.

In the closed position the gate may have a tendency to become wedged. At least the friction on the walls becomes of considerable importance. The supplementary float $j$ has been provided in such a manner as to release the gate at the start. As it leaves the water immediately, it does not introduce an error into the automatic regulation.

Figure 9:
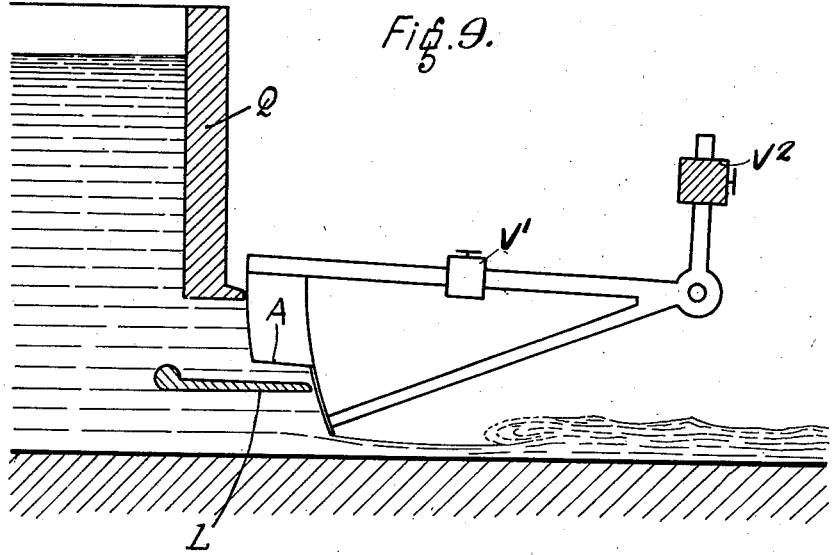
Fig. 9 shows the application of an oscillating gate according to Fig. 7, in the case of considerable fall in level between upstream and downstream, the installation shown ensuring a constant level upstream.

The gate has been shown in Fig. 6 with its axis downstream, however the axis may also be located upstream without departing from the scope of the invention. As a result of this the upstream and downstream levels in Fig. 9 are transposed. In this case it is the wall $C^1$ which it is necessary to extend instead of $C^2$, and the float $f$ should be located internally at the side of $C^2$.

A gate such as that shown in Fig. 6 creates a very small loss of load at maximum delivery as the face A of the float is then on a level with the surface and only the part K of the wall $C^2$ is immersed.

If, exceptionally, the flow exceeds the maximum value provided for, the gate continues to rise without introducing a supplementary loss of load.

It is possible to obtain a loss of load which is absolutely zero at full delivery by actuating the sector gate by an associated float mounted in a lateral well as above described. This complication is generally useless in canals with a slight slope such as that shown in Fig. 7, as in this case the velocities under the gate are so weak that the extension K of the wall $C^2$ need not necessarily be very long so that the pressure on the face A is practically equal to the upstream pressure.

When the downstream has a considerable slope the velocities are greater and it is necessary to provide a longer extension K so as not to introduce errors or to compensate these errors by suitable adjustment of the mass $V^2$.

Figure 8:
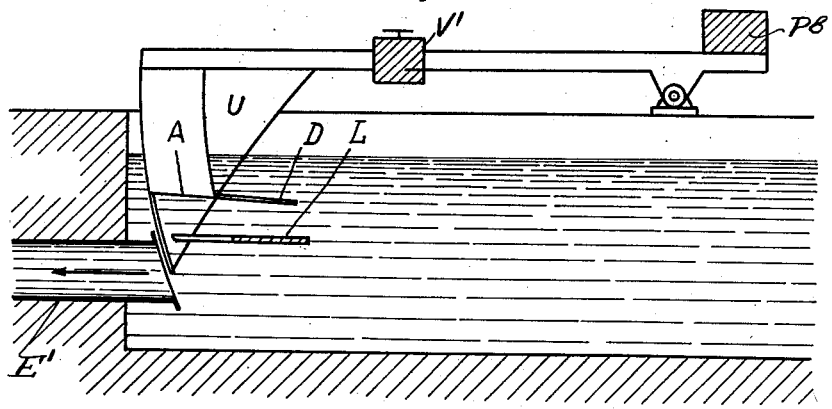
Fig. 8 shows an oscillating sluice with downstream discharge into a conduit, the upstream being an open channel.

In Fig. 8 there is shown a gate for regulating the upstream level according to the invention, the discharge downstream taking place through a conduit $E^1$. The operation is similar to that of the gate shown in Fig. 6. There is shown a stationary partition L, adapted to obviate too high velocities near the face A of the float which may be provided with a smoothing damping plate D similar to that shown in Fig. 5.

If necessary, reinforcing metal sheets U may be provided on condition that they are sufficiently thin so as not to introduce an appreciable error or in the event that any error is introduced it is exactly compensated in the calculation of the float. The partition L should naturally be provided with the necessary slots for the passage of the reinforcements U.

In Fig. 9 there is shown a gate for regulating the upstream level according to the invention where the level to be regulated is considerably higher than the axis of the gate. In this case it may be desirable to bring the delivery to the gate by a mouth or even a conduit.

The partition Q is stationary as also the partition L, the latter being adapted to reduce the velocities on the face A of the float. The operation takes place in the same manner as for the gates above described.

In Fig. 10 is shown a gate according to the invention adapted to automatically regulate the level downstream, the water arriving through a conduit $E^2$. It will be seen that when the level rises, the float immediately causes the gate leaf $C^3$ to close. In this form of the invention, the gate leaf is provided on the other side of the axis O relatively to the float F. Upon moving the gate to diminish delivery, the level comes to normal.

The gate may be constructed to maintain an exactly constant level or with any decrement desired. These factors, regulated level or decrement being also adjustable as in the case of the gates for regulating the upstream level previously described.

When the liquid flows through an orifice or a weir, the level downstream being maintained constant by the gate, the delivery itself is maintained constant by the gate. It will therefore be seen that the gate for regulating the downstream level may be utilised for maintaining a constant delivery. This may be utilised for maintaining a constant delivery through barrages in a river, the withdrawals of irrigation water, the feeding of sand filters etc.

Fig. 11 shows an oscillating float F with an opposing moment according to the invention used for maintaining constant the level in a tank Y which is emptied through a small orifice, the delivery of this orifice being thus rendered constant.

The apparatus is adjusted, as that in Fig. 1, so as to be in unstable equilibrium when the level is at a critical height, that of the axis for example. The volume of the float constituting an important fraction of the capacity of the tank it is not possible to move the float without changing the level. It will therefore be seen that the float regulates the constant level by progressively sinking in the tank in such a manner as to compensate exactly the delivery of the orifice. By reason of this arrangement an intermittent delivery emanating from the tap R may be rendered continuous. The position of the float, being dependent on the quantity of liquid in the tank, may serve to indicate this quantity. When the float reaches the bottom of the tank it ceases to regulate, it is then necessary to open the tap R so as to fill the tank and it is then necessary to close the tap when the float reaches the end of its upward stroke. This operation at the end of the stroke may be controlled by the float itself by known methods. By measuring the time taken by the float to pass through a fraction or the whole of its course towards the bottom it is possible to gauge the discharge orifice of the tank.

Figure 12:
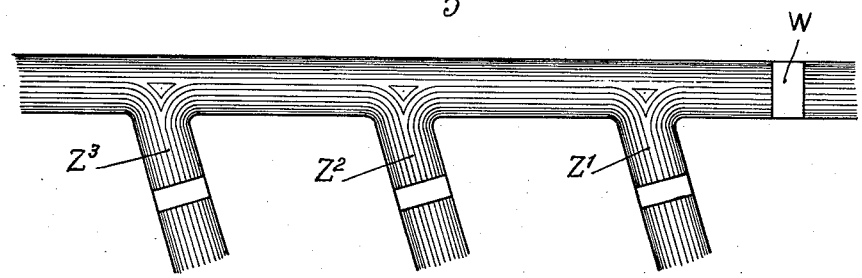
Fig. 12 shows diagrammatically in plan the method of utilising a gate for regulating the upstream level, in a system of irrigation canals.
Figure 13:
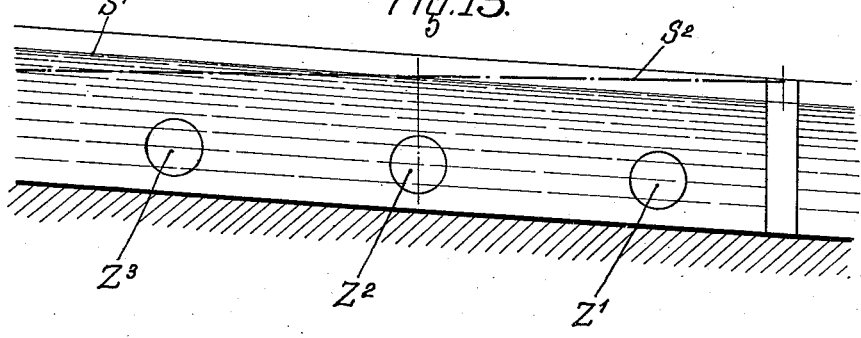
Fig. 13 is a view in elevation of the installation shown in Fig. 12.
Figure 14:
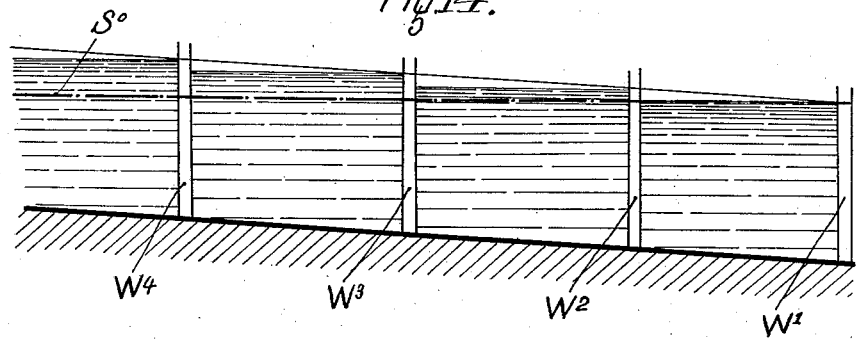
Fig. 14 shows diagrammatically a longitudinal section of a canal divided into sections each of which is controlled by an oscillating gate constructed according to the invention.

In Figs. 12, 13 and 14, there is shown in plan and in elevation a diagrammatic arrangement for using a gate for regulating the upstream level in a system of irrigation canals withdrawing liquid from a main canal.

The withdrawals are effected on the upstream canal by means of orifices $Z^1$, $Z^2$, $Z^3$ delivering into lateral canals. The position of the regulating gate is marked W. By reason of losses in load, the slope of the surface of the liquid in the canal varies with the delivery and it will be seen that, in order that the error in the adjustment of the level of the withdrawal $Z^3$ is not too large, it is necessary to acquiesce to a slight error in sign contrary to the withdrawal $Z^1$. In this case the level is established according to $S^1$ at full delivery and according to $S^2$ at low delivery. This requires a negative decrement of the gate W which can be obtained with a gate constructed according to the invention.

When use is made of a sufficiently great length of the supply canal, as is illustrated conventionally in Fig. 14, and consequently of the slope necessary for the flow, the level at zero delivery stays at $S^0$ in such a manner that the canal is almost empty towards the upstream. When it is desired to use the capacity of accumulation of the canal, gates for regulating the level according to the invention may be located at the points $W^1$, $W^2$, $W^3$, $W^4$ and the level at zero delivery will then be established in echelon thus enabling the capacity of delivery of the canal to be suitably used. According to the method of application provided it may be more convenient to use either gates for regulating the downstream level or gates for regulating the upstream level, the former being used when regulating the delivery at the upstream end of the canal and the latter when regulating the delivery at the upstream origin of the canal.

Devices for regulating the level from a distance may be used for simultaneously actuating the gates $W^1$, $W^2$, $W^3$, $W^4$ etc., and in this manner permit rapid starting and rapid stopping of the flow in the canal.

I claim:

1. A gate for maintaining a constant level in an upstream reach of an open channel, comprising a lever, means for mounting said lever for movement about a horizontal axis extending across said channel, a variably immersible float carried by the free end of said lever, means for opposing the lifting force of said float to maintain the float in unstable equilibrium for a predetermined water level, and a gate leaf carried by said float and extending across said channel.

2. A gate for maintaining a constant level in an upstream reach of an open channel, comprising a lever, means for mounting said lever for movement about a horizontal axis extending across said channel, a variably immersible float carried by the free end of said lever, means for opposing the lifting force of said float to maintain the float in unstable equilibrium for a predetermined water level, and a gate leaf carried by said float and extending across said channel, said gate leaf having an extension positioned beneath the float for maintaining the under surface of said float in a zone of low velocity water.

3. A gate for maintaining a constant level in an upstream reach of an open channel, comprising a lever, means for mounting said lever for movement about a horizontal axis extending across said channel, a variably immersible float carried by the free end of said lever, means for opposing the lifting force of said float to maintain the float in unstable equilibrium for a predetermined water level, a gate leaf carried by said float and extending across said channel, and an auxiliary float carried by said variably immersible float above the normal water level to limit the immersion of said variably immersible float.

4. A gate for maintaining a constant level in an upstream reach of an open channel, comprising a lever, means for mounting said lever for movement about a horizontal axis extending across said channel, a variably immersible float carried by the free end of said lever, means for opposing the lifting force of said float to maintain the float in unstable equilibrium for a predetermined water level, the downstream portion of said channel comprising a conduit having one end opening into said channel, and a gate leaf carried by said lever and extending across the open end of said conduit.

5. A gate for maintaining a constant level in an upstream reach of an open channel, comprising a lever, means for mounting said lever for movement about a horizontal axis extending across said channel, a variably immersible float carried by the free end of said lever, means for opposing the lifting force of said float to maintain the float in unstable equilibrium for a predetermined water level, a gate leaf carried by said float and extending across said channel, and a damping plate carried by the submerged portion of said float.

6. A gate for maintaining a constant level in a body of water having flow communication with a body of water of different head, comprising a lever, means for mounting said lever for movement about a horizontal axis, a variably immersible float carried by the free end of said lever, means for opposing the lifting force of said float to maintain the float in unstable equilibrium for a predetermined water level, and a gate leaf carried by said lever and controlling communication between said bodies of water, the means for opposing the lifting force of said float comprising a weight mounted for adjustment along the length of said lever.

7. A gate for maintaining a constant level in a body of water having flow communication with a body of water of different head, comprising a lever, means for mounting said lever for movement about a horizontal axis, a variably immersible float carried by the free end of said lever, means for opposing the lifting force of said float to maintain the float in unstable equilibrium for a predetermined water level, and a gate leaf carried by said lever and controlling communication between said bodies of water, the means for opposing the lifting force of said float comprising a weight mounted for adjustment along the length of said lever and a weight carried by said lever and adjustable in a direction transversely to the longitudinal direction of the lever.

PIERRE FRANÇOIS DANEL.